United States Patent
Takahata et al.

(10) Patent No.: US 7,915,776 B2
(45) Date of Patent: Mar. 29, 2011

(54) PERMANENT MAGNET TYPE ELECTRIC ROTARY MACHINE AND COMPRESSOR USING THE SAME

(75) Inventors: Ryoichi Takahata, Hitachi (JP); Satoshi Kikuchi, Hitachi (JP); Shinichi Wakui, Hitachi (JP); Keiji Noma, Shisui (JP); Masaharu Senoo, Narashino (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 12/816,123

(22) Filed: Jun. 15, 2010

(65) Prior Publication Data

US 2010/0244609 A1    Sep. 30, 2010

Related U.S. Application Data

(63) Continuation of application No. 11/780,157, filed on Jul. 19, 2007, now Pat. No. 7,768,172.

(30) Foreign Application Priority Data

Jul. 20, 2006   (JP) .................................. 2006-197562

(51) Int. Cl.
H02K 21/12  (2006.01)
(52) U.S. Cl. .......... 310/156.57; 310/156.53; 310/156.56
(58) Field of Classification Search .......... 310/156.38–156.47, 156.53–156.57, 310/216.111, 216.11, 261.1
See application file for complete search history.

(56) References Cited

U.S. PATENT DOCUMENTS

| | | | | |
|---|---|---|---|---|
| 4,658,165 | A | * | 4/1987 | Vanderschaeghe ...... 310/156.57 |
| 5,857,762 | A | * | 1/1999 | Schwaller ..................... 362/473 |
| 6,087,752 | A | * | 7/2000 | Kim et al. .................. 310/156.56 |
| 6,147,428 | A | * | 11/2000 | Takezawa et al. ........ 310/156.57 |
| 6,342,745 | B1 | * | 1/2002 | Sakai et al. ............... 310/156.56 |
| 6,525,442 | B2 | * | 2/2003 | Koharagi et al. ......... 310/156.48 |
| 6,917,133 | B2 | * | 7/2005 | Koharagi et al. ......... 310/156.57 |
| 6,987,343 | B2 | * | 1/2006 | Tagome et al. ........... 310/156.57 |
| 7,038,345 | B2 | * | 5/2006 | Fratta ....................... 310/156.53 |
| 7,282,827 | B2 | * | 10/2007 | Futami ..................... 310/156.48 |
| 2002/0145353 | A1 | * | 10/2002 | Kimura et al. ........... 310/156.57 |
| 2004/0041486 | A1 | * | 3/2004 | Gary ......................... 310/156.57 |

FOREIGN PATENT DOCUMENTS

| | | |
|---|---|---|
| CN | 1476146 | 2/2004 |
| JP | 2004-048912 | 2/2004 |
| JP | 2004-236401 | 8/2004 |
| JP | 2005-027422 | 1/2005 |

* cited by examiner

*Primary Examiner* — Thanh Lam
(74) *Attorney, Agent, or Firm* — Antonelli, Terry, Stout & Kraus, LLP.

(57) ABSTRACT

A permanent magnet type electric rotary machine includes a stator including a stator core having teeth and slots, and a rotor provided with permanent magnets as magnet poles in a rotor core. A pole core portion which between each of the permanent magnets and an outer surface of the rotor core is provided with a plurality of pole slits. A region of the pole core portion is defined by concave portions provided on q-axes to be interpolars on both sides of the pole core portion, and thereby configured that a gap between the outer surface on the q-axis of the rotor core and an inner surface of the stator core is larger than a gap between the outer surface on the d-axis of the pole core portion and the inner surface of the stator, so that magnetic fluxes from the permanent magnet pass through the pole core portion concentrately.

14 Claims, 11 Drawing Sheets

FIG. 9

PERMANENT MAGNET TYPE ELECTRIC ROTARY MACHINE AND COMPRESSOR USING THE SAME

CROSS REFERENCE TO RELATED APPLICATION

This application is a continuation of U.S. application Ser. No. 11/780,157, filed Jul. 19, 2007, now the U.S. Pat. No. 7,768,172 the contents of which are incorporated herein by reference.

CLAIM OF PRIORITY

The present application claims priority from Japanese application serial no. 2006-197562, filed on Jul. 20, 2006, the content of which is hereby incorporated by reference into this application.

TECHNICAL FIELD

The present invention relates to a permanent magnet type electric rotary machine including a rotor provided with a permanent magnet for a field magnet, and in particular, to a permanent magnet type electric rotary machine to be used in a compressor for an air conditioner, a refrigerator, a freezer, or a showcase.

BACKGROUND OF THE INVENTION

In this kind of permanent magnet type electric rotary machine, a concentrated winding has been used for a stator winding, and a rare-earth neodymium permanent magnet have been used for a field magnet, thereby having achieved higher efficiency of the rotary machine. Incidentally, vibration and noise components of an electric rotary machine have become larger as a magnetic material has gotten higher strength of a magnetic field, and various countermeasures against such problems have since been taken.

For example, according to a permanent magnet type electric rotary machine as disclosed in JP 2004-48912 A, it has proposed a method of that a plurality of concave portions (they are called as "gap face" for increasing partial gaps between an outer surface of a rotor and an inner surface of a stator) are provided on the outer surface of a rotor, and the respective gap faces are disposed so as to be displaced step by step in the axial direction of the rotor.

On the other hand, in a permanent magnet type electric rotary machine as disclosed in JP 2005-27422 A, it has been proposed that a rotor is provided with a plurality of slits extending from the outer periphery side of a permanent magnet embedded in a rotor toward the outer periphery the rotor.

As a result of adoption of a stator with a concentrated winding and a permanent magnet with a high residual magnetic flux density, efficiency of a permanent magnet synchronous motor has since been dramatically improved. On the other hand, the stator with the concentrated winding brings an increase in pulsation flux in comparison with a stator with a distributed winding, in theory, and furthermore the permanent magnet with the high residual magnetic flux density encourages the increase of the pulsation flux. As a consequence, it brings an increase in vibration and noise of the motor itself, and an intermediate frequency band noise, which is a most grating noise, increases markedly in the case of the motor being particularly assembled into a compressor.

Incidentally, according to JP 2004-48912A (hereinafter, it's called "patent document 1"), it since has adopted so-called skew structure where the plurality of gap faces are provided on the outer surface of the rotor and the respective gap faces are disposed so as to be displaced step by step in the axial direction, so that it is possible that a distribution of a gap magnetic flux density can have a spatial phase difference in the axial direction of the motor. As a result, pulsation components in the magnetic flux density distribution are offset to each other in the axial direction, so that vibration and noise-causing components can be reduced.

On the other hand, according to JP 2005-27422A (hereinafter, it's called "patent document 1"), it can provide a structure where a waveform of induced electromotive force can be turned into a sinusoidal wave by adopting the rotor with the plurality of the slits extending from the outer periphery side of the permanent magnet embedded in the rotor toward the outer periphery thereof. Such a structure enables an armature current to be turned into the form of a sinusoidal wave, so that it is possible to reduce a pulsational torque generated by interaction between the induced electromotive force and the armature current.

According to the conventional technology described as above, for example, the technology of the patent document 1 can reduce noise occurring in relatively high frequency bands, and the technology of the patent document 2 can reduce noise occurring in relatively low frequency bands. However, they are not effective sufficiently to reduce the noise in the intermediate frequency band that is a problem picked up herein.

The reason for this is that, in the case of the technology according to the Patent Document 1, in order to cancel out a harmonic component of a low order being longer in wavelength, it needs to adopt a large skew pitch structure, resulting in deterioration of characteristics. In consequence, if an emphasis is placed on maintenance of the characteristics, the skew pitch naturally becomes smaller, thereby providing an effect of reduction only in harmonic components of a relatively high order being shorter in wavelength.

In the case of Patent Document 2, distribution of magnetomotive force of the magnet, which is substantially in the form of a square wave, can be improved stepwise by providing the rotor with the slits. However, if an attempt is made to cope with harmonic components of a high order by increasing the number of the slits, this will cause an increase in magnetic resistance of the rotor, resulting in deterioration of the characteristics. For this reason, there are limitations to the number of the slits that can be disposed in a rotor core, so that this method will be effective only for harmonic components of a low order.

SUMMARY OF THE INVENTION

An object of the present invention is to provide a permanent magnet type electric rotary machine low in vibration as well as noise without causing deterioration in performance such as motor efficiency and so forth, and a compressor using the same.

A permanent magnet type electric rotary machine according to the invention is comprised of:

a stator including a stator core having teeth and slots between adjacent teeth, and a concentrated winding as an armature winding installed in each of the slots so as to surround each of the teeth; and a rotor provided with permanent magnets as magnet poles installed in a plurality of permanent magnet insertion holes provided in a rotor core respectively, the rotor being rotatably supported inside the stator keeping a gap between the rotor core and the stator core by a rotating shaft, wherein defining that a magnetic flux axis of each of the permanent magnets is a d-axis, and an axis 90° apart in electrical angle from the d-axis is a q-axis, respective install positions of the permanent magnets in the rotor core are set between adjacent q-axes, wherein a pole core portion between each of the permanent magnets and an outer surface of the rotor core is provided with a plurality of pole slits, wherein the region of the pole core portion is defined by concave portions provided on q-axes to be interpolars on both sides of the pole core portion, and thereby configured that a gap (g2) between the outer surface on the q-axis of the rotor core and an inner surface of the stator core is larger than a gap (g1) between the outer surface on the d-axis of the pole core portion and the inner surface of the stator, so that magnetic fluxes from the permanent magnet pass through the pole core portion concentrately, wherein the outer surface like an arc-shape of the pole core portion is formed asymmetrically with respect to the d-axis by making circumferential-direction lengths of the concave portions on both sides of the pole core portion different from each other; and wherein each of the concave portion is formed with a stepped zigzag skew structure in the axial direction of the rotor core, so that the pole core portion has a stepped zigzag skew structure, and both end sides in axial direction of the zigzag skew structure are formed in the same shape.

DETAILED DESCRIPTION OF THE INVENTION

Embodiments of the present invention are described hereinafter with reference to FIGS. 1 to 9. Reference numerals in common with the respective figures indicate identical parts, respectively. Further, in this case, there is shown a four-polar permanent magnet type electric rotary machine, and a ratio between the number of poles of a rotor and the number of slots of a stator is set to 2:3. However, even with a ratio between the number of the poles and the number of the slots, other than the said ratio, the substantially same effect can be obtained.

Figure 1A:
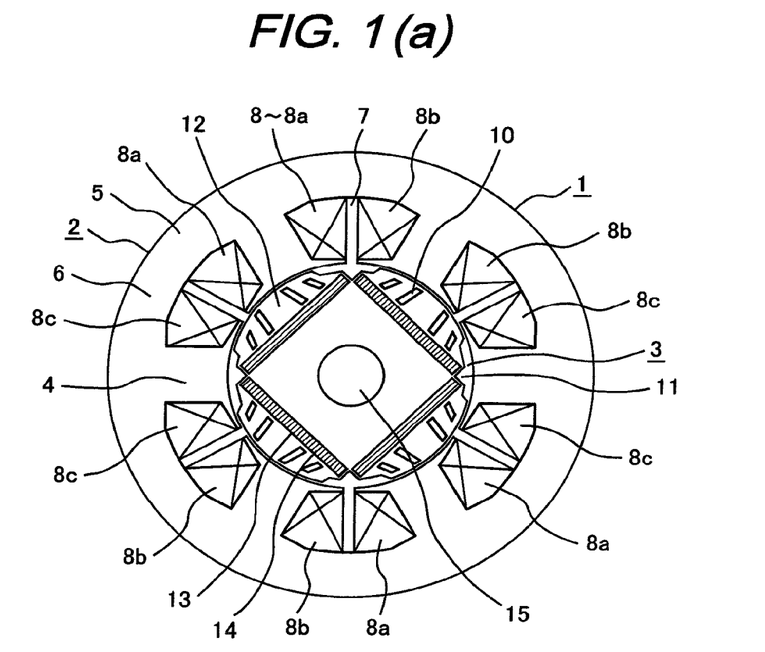
FIG. 1(a) is a cross-sectional view of a stator 2 and a B-part of a rotor 3 (rotor core 12) of Embodiment 1 shown in FIG. 4.
Figure 1B:
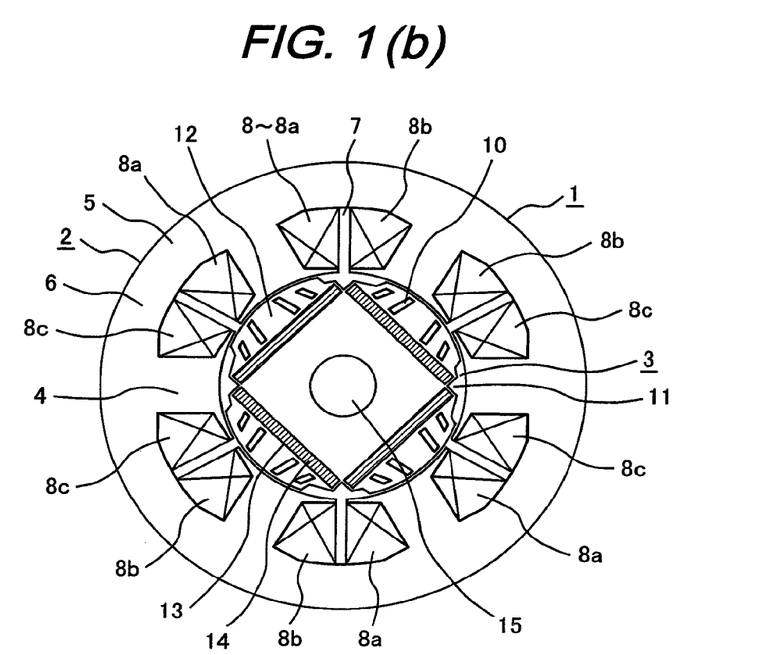
FIG. 1(b) is a cross-sectional view of the stator 2 and an A-part of the rotor 3 shown in FIG. 4.
Figure 2A:
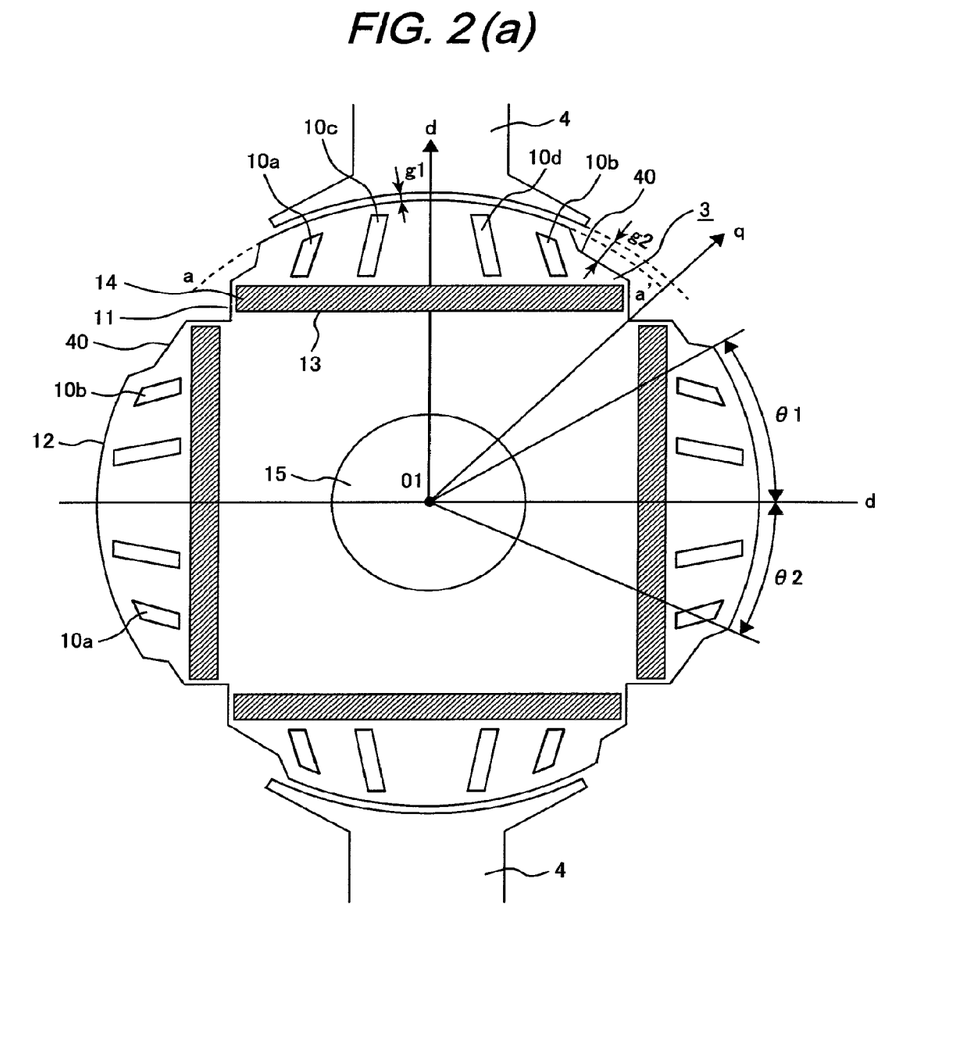
FIG. 2(a) is a cross-sectional view of a part of teeth 4 of the stator 2 and the B-part of the rotor 3 shown in FIG. 4.
Figure 2B:
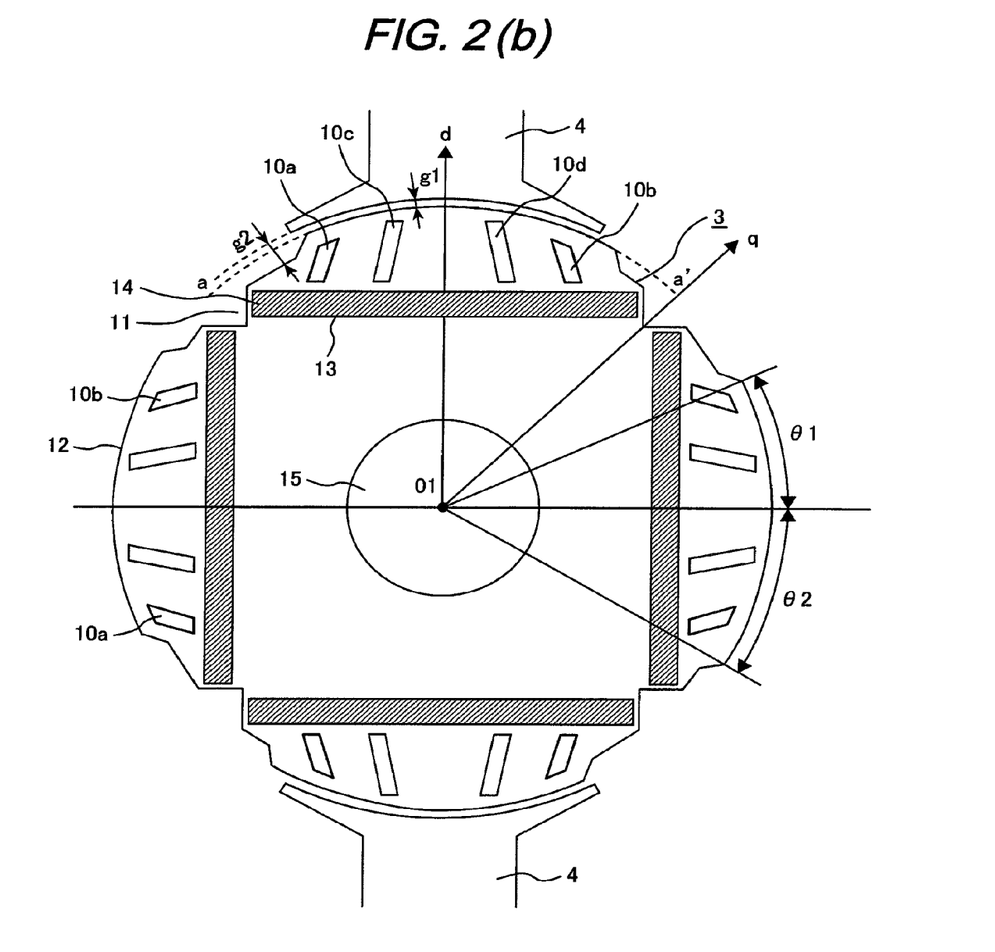
FIG. 2(b) is a cross-sectional view of a part of teeth 4 of the stator 2 and the A-part of the rotor 3 shown in FIG. 4.
Figure 3:
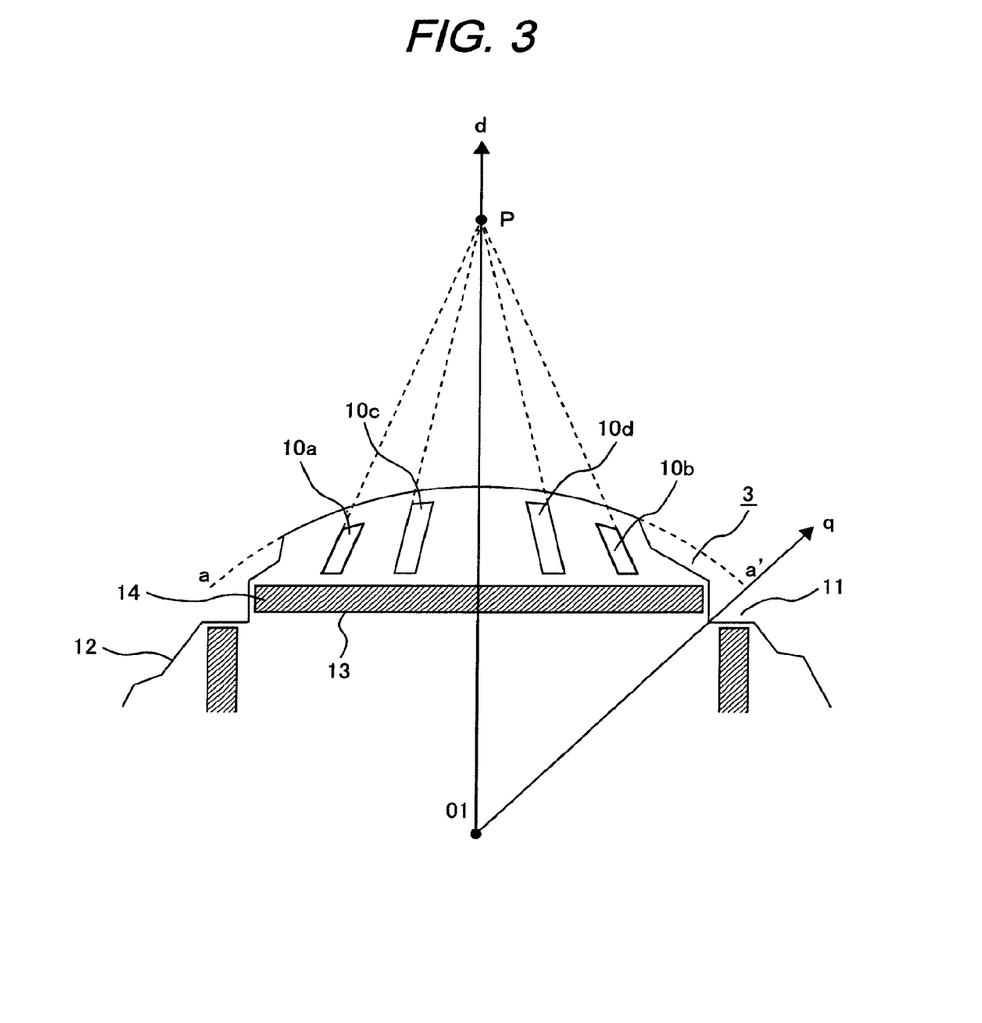
FIG. 3 is a partial magnified view of the B-part of the rotor 3 (rotor core 12).
Figure 4:
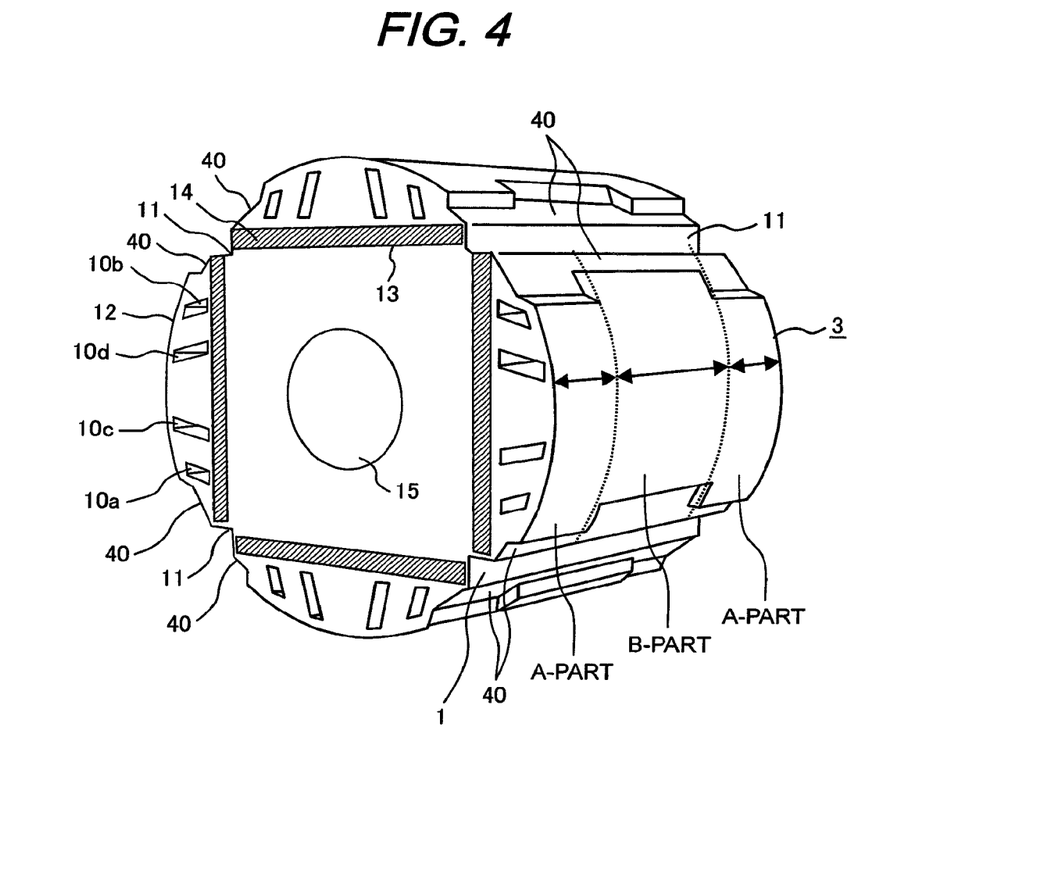
FIG. 4 is a perspective view showing the rotor core 4 of the permanent magnet type electric rotary machine according to Embodiment 1 of the present invention.

FIGS. 1(a) and 1(b) are cross-sectional views of Embodiment 1 of a permanent magnet type electric rotary machine according to the present invention; wherein FIG. 1(a) is a cross-sectional view of a stator 2 and a B-part of a rotor 3 shown in FIG. 4; FIG. 1(b) is a cross-sectional view of the stator 2 and an A-part of the rotor 3 shown in FIG. 4. FIG. 2(a) is a cross-sectional view of a part of teeth 4 of the stator 2 and the B-part of the rotor 3 shown in FIG. 4; and FIG. 2(b) is a cross-sectional view of a part of teeth 4 of the stator 2 and the A-part of the rotor 3 shown in FIG. 4. FIG. 3 is a partial magnified view of the B-part of the rotor 3 (rotor core 12). FIG. 4 is a perspective view showing the rotor core 4 of the permanent magnet type electric rotary machine according to Embodiment 1.

Figure 9:
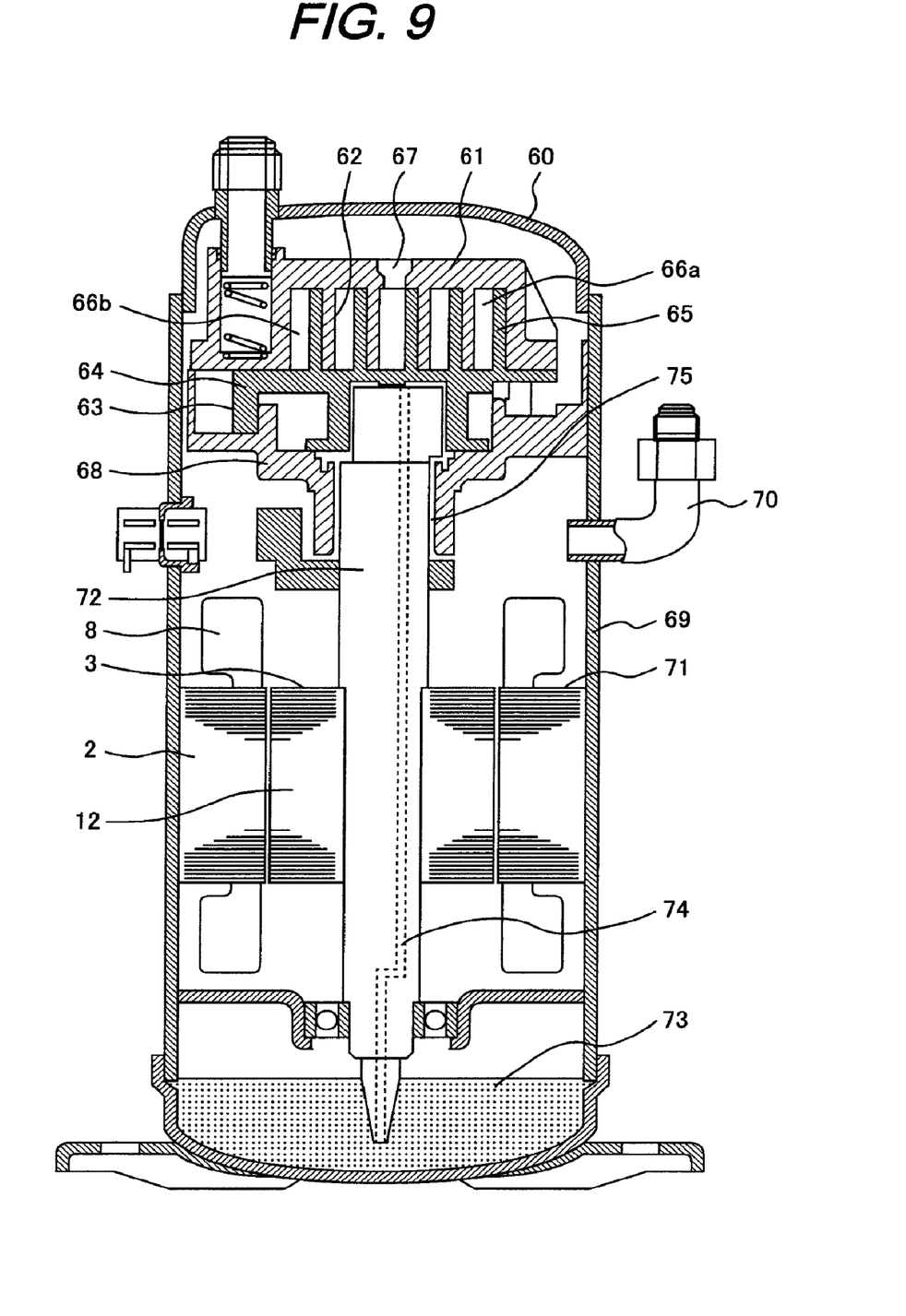
FIG. 9 is a sectional structure of a compressor associated with the present invention.

FIG. 9 is a view showing a sectional structure of a compressor associated with the present invention. Table 1 shows respective results of audibility tests conducted on compressors with rotors of various structures.

In FIGS. 1(a) 1(b), the permanent magnet type electric rotary machine 1 includes the stator 2 and the rotor 3. The stator 2 includes a stator core 6 comprising teeth 4 and a core back 5, and an armature winding 8 (including a U-phase winding 8a, a V-phase winding 8b, and a W-phase winding 8c, for three-phase winding) comprising concentrated windings. Each of the concentrated windings 8 is mounted in a slot 7 between the respective adjacent teeth 4 so as to surround each of the teeth 4. In this case, as the permanent magnet type electric rotary machine 1 has four-polar and six slots, a slot pitch is 120° in electrical angle.

As shown in FIGS. 1(a), (b) to 4, the rotor 3 has a cylindrical rotor core 12a, wherein the rotor core 12a has a shaft hole 15 for inserting and fixing a shaft of the rotor 3, and permanent magnets 14 inserted into respective slit holes 13 for permanent magnet insertion. In the embodiment, for example, four slit holes 13 are positioned in a square arrangement around the shaft hole 15 in the vicinity of an outer surface of the rotor core 12, and each of slit holes is bored along a direction of the shaft hole 15. Each of rare-earth neodymium permanent magnet 14, which has a shape like plate, is securely installed in each of the slit holes 13 as permanent magnet insertion holes. A magnetic flux axis of each permanent magnet 14 is defined as a d-axis. An axis positioned between adjacent magnetic poles (between adjacent permanent magnets 14), which is positioned 90° apart from the d-axis in electrical angle, is defined as a q-axis. In this case, the outer surface of the rotor core 12 is provided with plural grooves 11 (for example, four grooves in this embodiment) in an axial direction of the rotor core 12 at positions on the respective q-axes between adjacent poles. Each of the grooves 11 although is formed in a v-shape cut in the embodiment, it may by adopted with other shaped cut.

Furthermore, as shown in distinctly in FIGS. 2(a), 2(b) and FIG. 4, the rotor core 12 is comprised of a multilayered structure of two A-part blocks and a B-part block between the A-part blocks so as to form concave portions 40 like stepped v-shape skew structure (in other words, stepped zigzag line) in view of the circumferential direction on the outer surface of the rotor core 12. Each concave portion 40 is formed from end to end of the rotor core 12 in an axial direction of the rotor core 12. Each groove 11 is positioned in each concave portion 40. The concave portions 40 serves as a gap face for forming a gap g2 between the concave portion 40 and an inner surface of the stator 2. The outer surface other than grooves 11 and concave portions 40 of the rotor core 12 serve as a gap face for forming a gap g1 between the rotor core 12 and the stator core 4. That is, the outer surface of the rotor core 12 is provided with two kinds of gap faces for the gaps g1 and g2. Further, the groove 11 and the concave portion 40 constitute a cut portion formed by a combination of a straight-line cut and an arc-shaped cut.

In the B-part of the rotor core 12 shown in FIG. 2($a$) and in the region to be the gap face for the gap g1, $\theta 1$ is defined as an angle from the d-axis up to one side concave portion 40 in the circumferential direction of the rotor core 12, and $\theta 2$ is defined as an angle from the d-axis up to another side concave portion. The region of the gap face for the gap g1 is configured that $\theta 1$ and $\theta 2$ have a relationship of $\theta 1 > \theta 2$, and the sum of $\theta 1$ and $\theta 2$ falls in a range of 90° to 120° in electrical angle. On the other hand, in each A-part of the rotor core 12 shown in FIG. 2($b$) and in the region to be the gap face for the gap g1, $\theta 1$ and $\theta 2$, which are defined as with the above-mentioned case, have a relationship of $\theta 1 < \theta 2$. The sum of $\theta 1$ and $\theta 2$ also falls in a range of 90° to 120° in electrical angle.

In FIGS. 1($a$), 1($b$), 2($a$), 2($b$) and FIG. 3, each region between each permanent magnet 14 and the outer surface of the rotor 12 is provided with a plurality of slits 10 (10$a$ to 10$d$) so as to be arranged symmetrically both sides of the d-axis, and as shown in FIG. 3, these slits 10 are disposed such that extended lines of respective slant directions thereof with respect to the d-axis intersect to each other at a point P on the d-axis.

Next, the motor-driven compressor adopting the above-mentioned electric rotary machine 1 for the motor will be explained in FIG. 9. In FIG. 9, the compressor has a statutory scroll member 60, a rotary scroll member 63, a crankshaft 72, and the permanent magnetic type electric rotary machine 1. The statutory scroll member 60 includes a scroll wrap 62 formed inside an end plate 61. The rotary scroll member 63 includes a movable scroll wrap 65 formed on a movable end plate 64. The movable scroll wrap 65 and the statutory wrap 62 mesh with each other. The above-mentioned parts of the compressor are installed inside a cylindrical housing 69 of the compressor. The movable scroll member 63 is rotated with the permanent magnet type electric rotary machine 1 through the crankshaft 72, thereby carrying out a compression motion.

A compression chamber 66 (66$a$, 66$b$, . . . ) is formed by the statutory scroll member 60 and the movable scroll member 63. An outside chamber portion 66$a$-66$b$ positioned closest to the outside diameter of the compression chamber 66 moves toward the center sides of both the scroll members 63 and 60 as the movable scroll member 63 rotates, and thereby the volume of the outside chamber portion 66$a$-66$b$ is compressed cyclically. When the outside chamber portion 66$a$-66$b$ reach to the closest position of the center side of both the scroll members 63 and 60, a compressed gas in the compression chamber 66 is discharged through an outlet port 67 communicating with the compression chamber 66.

The compressed gas discharged is sent out through respective gas passages (not shown) provided in the statutory scroll member 60 and a frame 68, and reaches an interior of the compression vessel 69 in the lower part of the frame 68. After that, the compressed gas is discharged to outside of the compressor through a discharge pipe 70 provided in the sidewall of the compression vessel 69.

The permanent magnet type electric rotary machine 1 for driving the motor-driven compressor is controlled by an inverter (not shown) separately placed, and is rotated at a rotational speed suitable for the compression motion. In this case, the permanent magnet type electric rotary machine 1 includes the stator 2, and the rotor 3, and an upper-side portion of the crankshaft 72 to be also the rotary shaft of the rotor 3 serves as a crankshaft. An oil hole 74 is formed inside the crankshaft 72, and a lubricating oil in an oil sump 73 provided in the lower part of the compression vessel 69 is fed to a plain bearing 75 via the oil hole 74 by the crankshaft 72 in rotation.

In order to execute noise audibility tests, the permanent magnet type electric rotary machines including the rotors in various shapes, respectively, were assembled in the compressor made up as above, and the noise audibility tests were executed on the respective compressors. Table 1 shows results of the audibility tests.

TABLE 1

Results of Audibility Tests on Compressors in Various Rotor Structures

| Noise frequency bands | Rotor structure similar to that for Patent Document 1 | Rotor structure similar to that for Patent Document 2 | Present invention |
|---|---|---|---|
| Lower band | X | ○ | ○ |
| Intermediate band | X | X | ⊙ |
| Higher band | ○ | X | ○ |

Herein,
X means no good,
○ means good,
⊙ means best.

In Table 1, frequency bands of grating noises are broadly classified into three types of bands, namely, a lower band, an intermediate band, and a higher band, and particularly, it has been found that noise components in the intermediate band occurs markedly in the motor-driven compressor.

As a result of analyzing relationships between frequency bands of those noises and various rotor-structures, it has been found that in the case of the rotor structure similar to that (substantially the so-called skew structure) for Patent Document 1, an effect of reduction in noise components in higher bands was obtained, but there was little reduction of noise components in lower and intermediate bands. Further, it has been found that in the case of the rotor structure similar to that (the plurality of slits are provided on the outer surface of the rotor) for Patent Document 2, it was possible to reduce noise components in lower bands, but there was little reduction of noise components in the intermediate and higher bands. On the other hand, in the case of the rotor structure according to the present invention, it has been found that the noise components in the intermediate band were significantly reduced in addition to an effect of reduction in noise components in the lower and higher bands. Furthermore, concerning noise components of the lower and higher bands, the reduction effects of the present invention is not much different from the effects of the rotor structures similar to those for Patent Documents 1, and 2, respectively.

As result of studying factors for a occurrence of those noises, it has been found out that the noises were occurred due to the so-called electromagnetic exciting force that occurs according to the product of fundamental wave magnetic flux and harmonic magnetic flux. In this connection, it has been observed that in the case of the rotor structure similar to that for Patent Document 1, significant reduction of noises was made in harmonic magnetic flux components of a relatively high order such as $25^{th}$ order and $27^{th}$ order; in the case of the rotor structure similar to that for Patent Document 2, significant reduction of noises was made in harmonic magnetic flux components of a low order such as $5^{th}$ order and $7^{th}$ order. Further, it has been revealed that in the case of the rotor structure according to the present invention, significant reduction of noises was made in harmonic magnetic flux components of $11^{th}$ order, $13^{th}$ order, $15^{th}$ order, and $17^{th}$ order, and so forth, regarded causing electromagnetic exciting force in relatively intermediate bands.

As described in the foregoing, when the permanent magnet type electric rotary machine described as above is applied to various types of compressors for use in an air conditioner, and so forth, it is possible to provide a compressor low in vibration as well as noise.

Figure 5A:
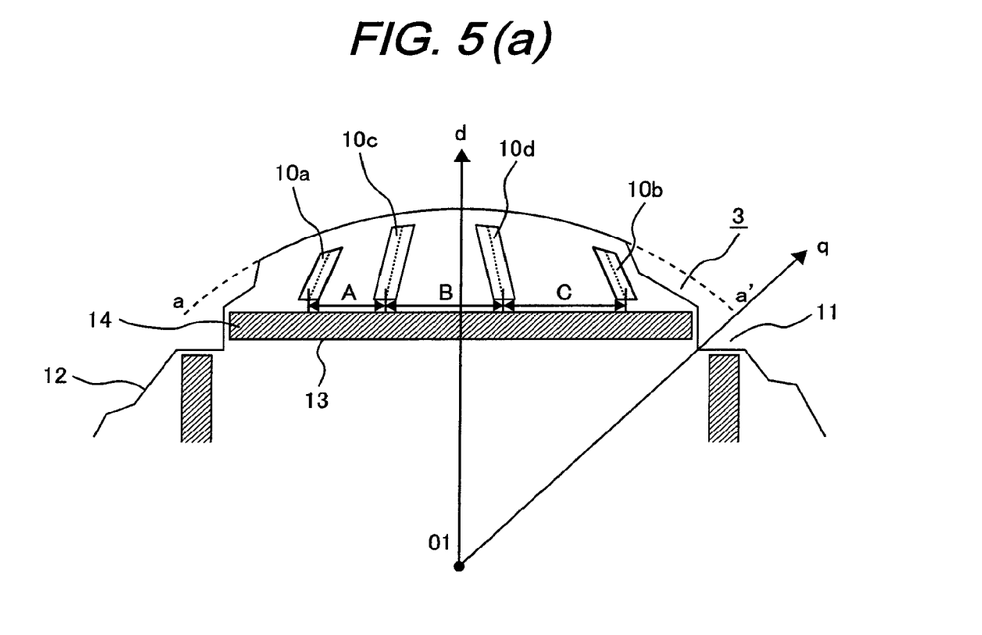
FIG. 5(a) is a partial magnified cross-sectional view of a B-part of the rotor core 12 corresponding to FIG. 4, in Embodiment 2 of the present invention.
Figure 5B:
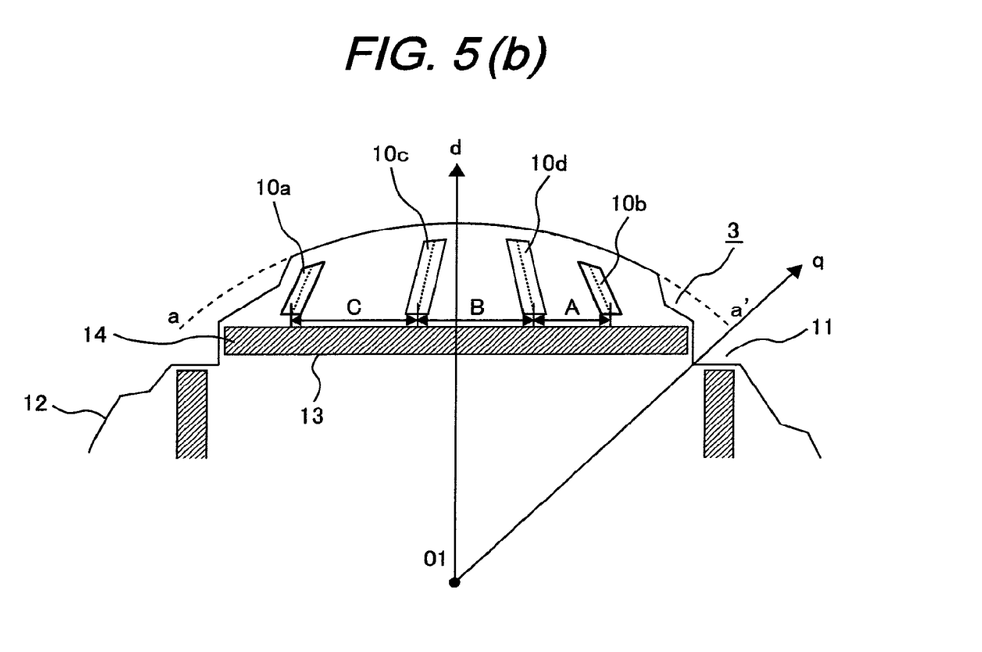
FIG. 5(b) is a partial magnified cross-sectional view of an A-part of the rotor core 12 corresponding to FIG. 4, in Embodiment 2.

FIGS. 5(a) and 5(b) are partial magnified cross-sectional views showing a shape of a rotor core 12 of a permanent magnet type electric rotary machine according to Embodiment 2 of the present invention. In detail of them, FIG. 5(a) is a partial magnified cross-sectional view of a B-part of the rotor core 12 corresponding to FIG. 4, and FIG. 5(b) is a partial magnified cross-sectional view of an A-part of the rotor core 12 corresponding to FIG. 4. Parts identical to those in FIGS. 1 to 4, respectively, are denoted by like reference numerals. The shape of the rotor core, in FIGS. 5 (a) and 5(b), partially differs from those shown in FIGS. 1 to 4, respectively, in that respective intervals A, B, and C between adjacent slits 10 (10a to 10d) are set by irregular pitches. With adoption of such a configuration, it becomes possible to make finer adjustment of magnetic flux distribution by making adjustments of magnetic skew angles in respective parts A and B.

Figure 6A:
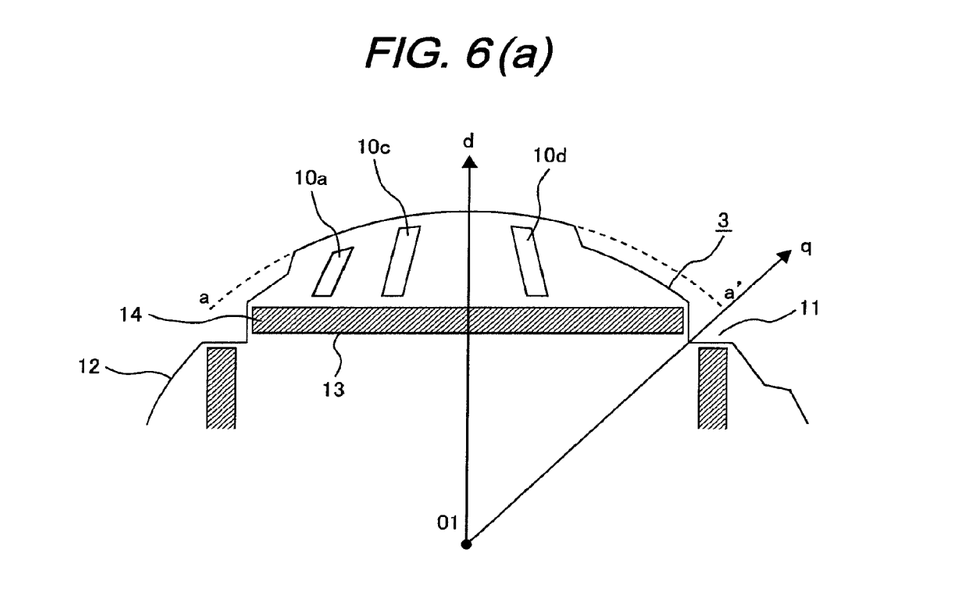
FIG. 6(a) is a partial magnified cross-sectional view of a B-part of the rotor core 12 corresponding to FIG. 4, in Embodiment 3 of the present invention.
Figure 6B:
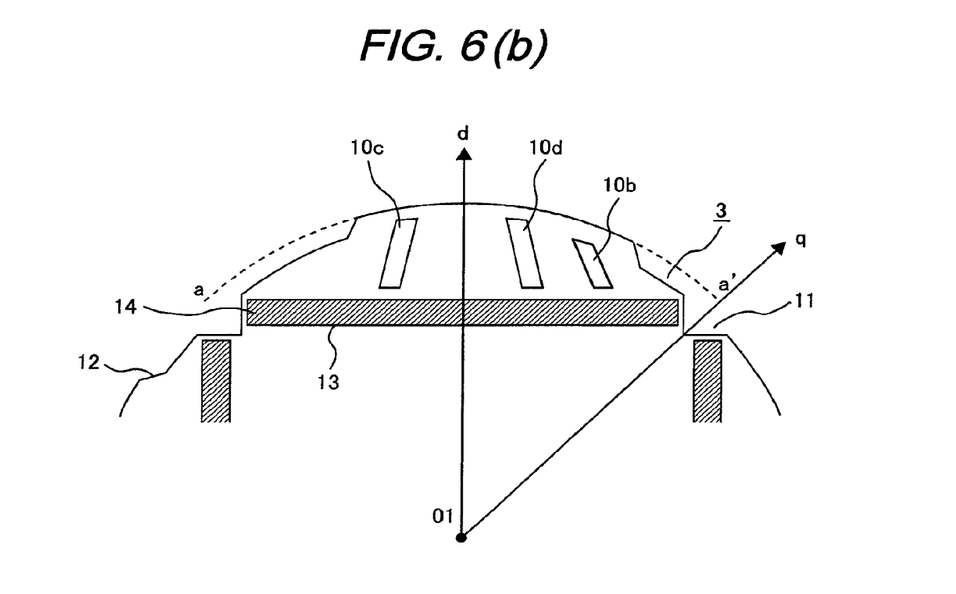
FIG. 6(b) is a partial magnified cross-sectional view of an A-part of the rotor core 12 corresponding to FIG. 4, in Embodiment 3.

FIGS. 6(a) and 6(b) are partial magnified cross-sectional view showing a shape of a rotor core 12 of a permanent magnet type electric rotary machine according to Embodiment 3 of the present invention. In detail of them, FIG. 6(a) is a partial magnified cross-sectional view of a B-part of the rotor core 12 corresponding to FIG. 4, and FIG. 6(b) is a partial magnified cross-sectional view of an A-part of the rotor core 12 corresponding to FIG. 4. Parts identical to those in FIG. 5 are denoted by like reference numerals. The shape of the rotor core, in FIGS. 6 (a) and (b), partially differs from that shown in FIG. 5 in that slits 10 formed such that one half-side with respect to the d-axis is provided with a length of slit 10d (B part of FIG. 6(a)) or slit 10c (A part of FIG. 6(b)), and another half-side with respect to the d-axis is provided with two length of slits 10a, 10c (B part of FIG. 6 (a)) or slits 10b, 10d (A part of FIG. 6 (b)). With adoption of such a configuration of the arrangement that different numbers of slits are set from one half-side to another with respect to the D-axis, it is possible to simply obtain an advantage similar to that for the rotor shown in FIG. 5.

Figure 7A:
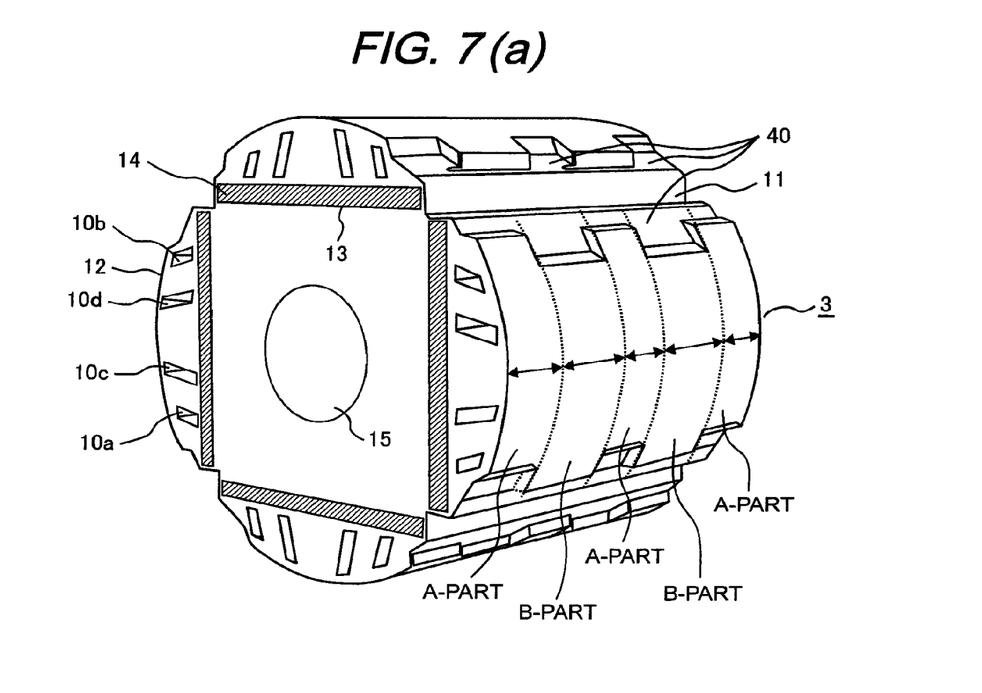
FIG. 7(a) is a perspective view showing a shape of a rotor core 12 of a permanent magnet type electric rotary machine according to Embodiment 4 of the present invention.
Figure 7B:
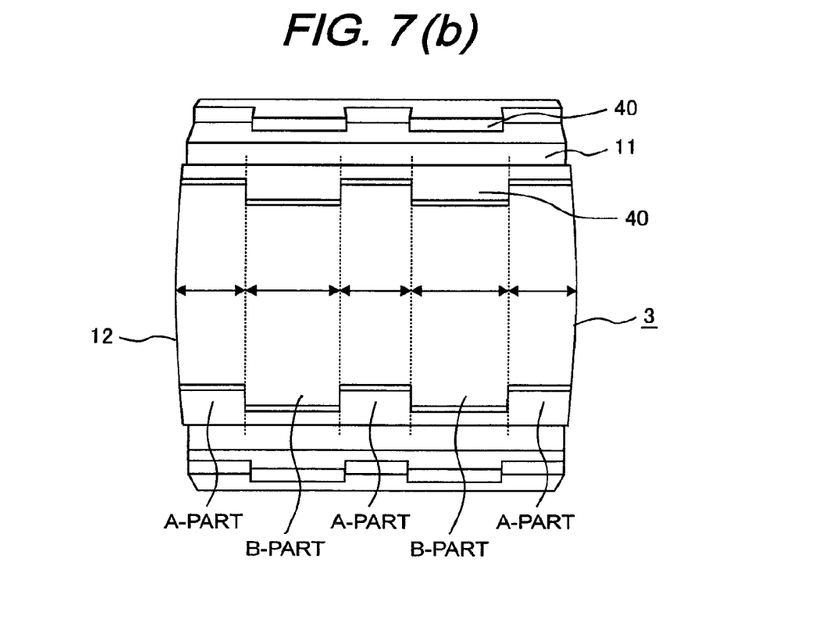
FIG. 7(b) is a front view showing a shape of a rotor core 12 thereof.

FIG. 7(a) is a perspective view showing a shape of a rotor core 12 of a permanent magnet type electric rotary machine according to Embodiment 4 of the present invention. FIG. 7(b) is a front view showing a shape of a rotor core 12 thereof. Parts identical to those in FIG. 4 are denoted by like reference numerals. The shape of the rotor core, in FIG. 7, partially differs from that shown in FIG. 4 in that: the rotor core 12 is comprised of a multilayered structure of three A-part blocks and two B-part blocks alternately being layered to each other, so that concave portions 40 are formed like two adjacent stepped v-shape skew structures in a form like a stepped w-shape skew structure (in other words, stepped zigzag line) in the circumferential direction on the outer surface of the rotor core 12.

Even according to such a configuration, it is possible to suppress an axial thrust. Further, since it is possible to make an increase in magnetic coupling between adjacent parts A and B in the axial direction, apparent skew pitches can be rendered smaller, so that skew pitches can be suitably adjusted while using two kind of parts (A-part block and B-part block).

Figure 8A:
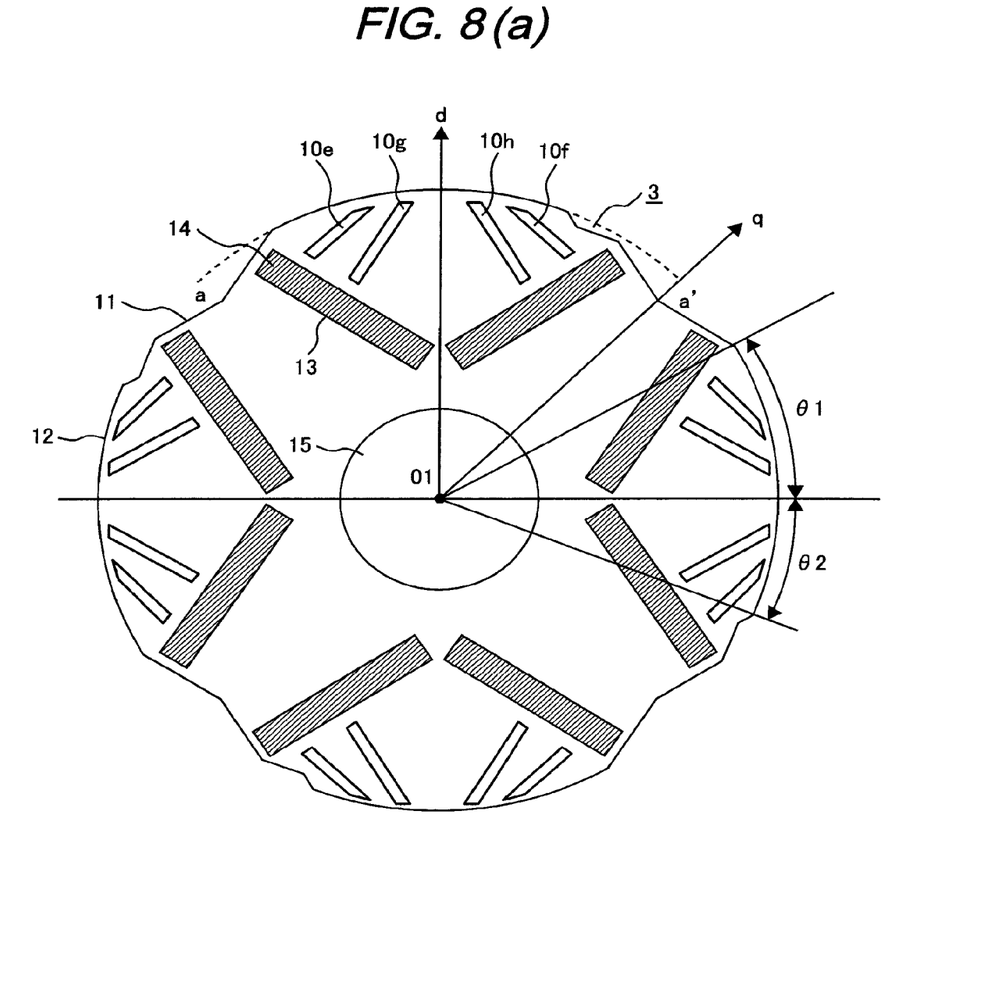
FIG. 8(a) is a cross-sectional view of a B-part of the rotor core 12 corresponding to FIG. 4, in Embodiment 5 of the present invention.
Figure 8B:
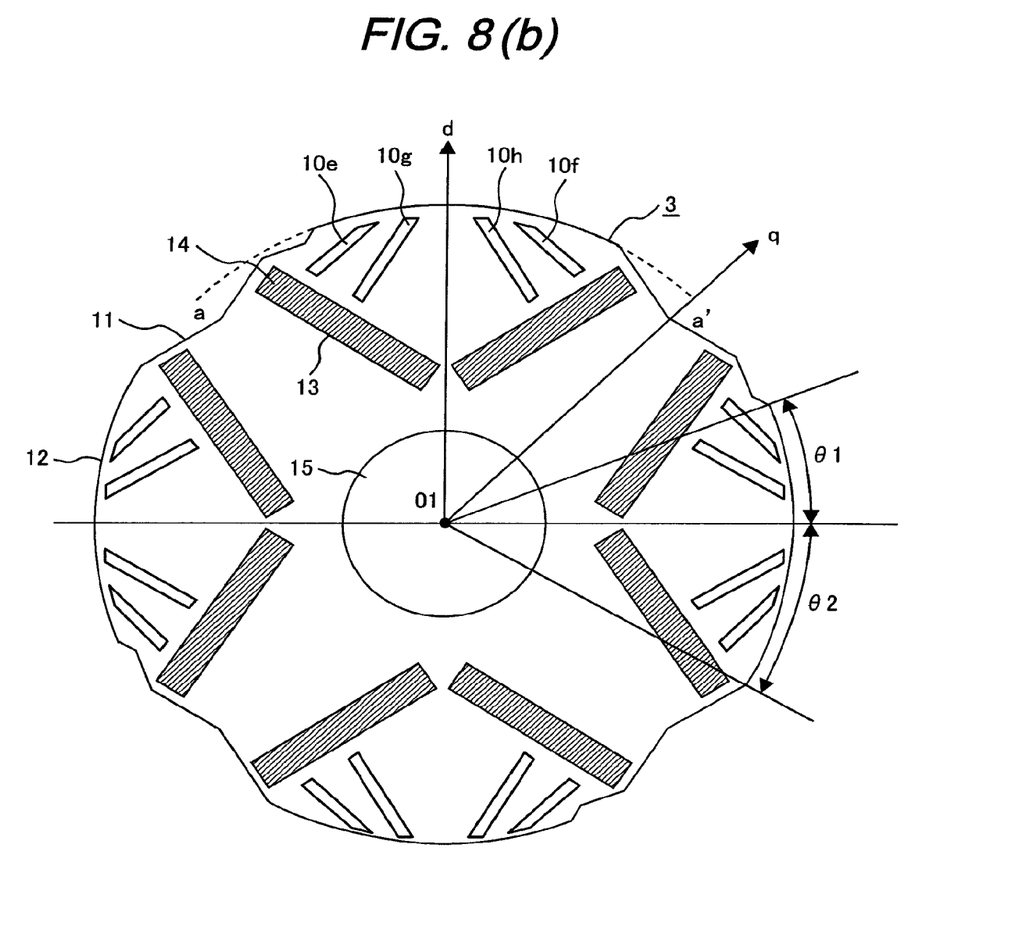
FIG. 8(b) is a cross-sectional view of an A-part of the rotor core 12 corresponding to FIG. 4, in Embodiment 5.

FIGS. 8(a) and (b) are cross-sectional view showing a shape of a rotor core of a permanent magnet type electric rotary machine according to Embodiment 5 of the present invention.

In detail of them, FIG. 8(a) is a cross-sectional view of a B-part of the rotor core 12 corresponding to FIG. 4, and FIG. 8(b) is a cross-sectional view of an A-part of the rotor core 12 corresponding to FIG. 4. Parts identical to those in FIG. 2 are denoted by like reference numerals. The shape of the rotor core, in FIG. 8, partially differs from that shown in FIG. 2 in that two pieces of permanent magnets 14 are provided per one pole, and are disposed so as to form a V-shape arrangement that protrudes toward a shaft hole 15. With adoption of such a configuration, it is possible to obtain the same effect as FIG. 2.

According to the invention, it is possible to provide a permanent magnet type electric rotary machine capable of reducing harmonic components in intermediate frequency bands, and improving audibility.

What is claimed is:
1. A permanent magnet type electric rotary machine comprising:
    a stator including a stator core having teeth and slots between adjacent teeth, and a concentrated winding as an armature winding installed in each of the slots so as to surround each of the teeth; and
    a rotor provided with permanent magnets as magnet poles installed in a plurality of permanent magnet insertion holes provided in a rotor core respectively, the rotor being rotatably supported inside the stator keeping a gap between the rotor core and the stator core by a rotating shaft,
    wherein defining that a magnetic flux axis of each of the permanent magnets is a d-axis, and an axis 90° apart in electrical angle from the d-axis is a q-axis, respective install positions of the permanent magnets in the rotor core are set between adjacent q-axes,
    wherein a pole core portion between each of the permanent magnets and an outer surface of the rotor core is provided with a plurality of pole slits,
    wherein the region of the pole core portion is defined by concave portions provided on q-axes to be interpolars on both sides of the pole core portion, and thereby configured that a gap (g2) between the outer surface on the q-axis of the rotor core and an inner surface of the stator core is larger than a gap (g1) between the outer surface on the d-axis of the pole core portion and the inner surface of the stator, so that magnetic fluxes from the permanent magnet pass through the pole core portion concentrately,
    wherein the outer surface like an arc-shape of the pole core portion is formed asymmetrically with respect to the d-axis by making circumferential-direction lengths of the concave portions on both sides of the pole core portion different from each other; and wherein each of the concave portion is formed in the axial direction of the rotor core, with a stepped v-shape skew structure in view of the circumferential direction of the rotor core, so that the pole core portion has a stepped v-shape skew structure.

2. A permanent magnet type electric rotary machine comprising:
a stator including a stator core having teeth and slots between adjacent teeth, and a concentrated winding as an armature winding installed in each of the slots so as to surround each of the teeth; and
a rotor provided with permanent magnets as magnet poles installed in a plurality of permanent magnet insertion holes provided in a rotor core respectively, the rotor being rotatably supported inside the stator keeping a gap between the rotor core and the stator core by a rotating shaft,
wherein defining that a magnetic flux axis of each of the permanent magnets is a d-axis, and an axis 90° apart in electrical angle from the d-axis is a q-axis, respective install positions of the permanent magnets in the rotor core are set between adjacent q-axes,
wherein a pole core portion between each of the permanent magnets and an outer surface of the rotor core is provided with a plurality of pole slits,
wherein the region of the pole core portion is defined by concave portions provided on q-axes to be interpolars on both sides of the pole core portion, and thereby configured that a gap (g2) between the outer surface on the q-axis of the rotor core and an inner surface of the stator core is larger than a gap (g1) between the outer surface on the d-axis of the pole core portion and the inner surface of the stator, so that magnetic fluxes from the permanent magnet pass through the pole core portion concentrately,
wherein the outer surface like an arc-shape of the pole core portion is formed asymmetrically with respect to the d-axis by making circumferential-direction lengths of the concave portions on both sides of the pole core portion different from each other; and
wherein each of the concave portion is formed with a stepped zigzag skew structure in the axial direction of the rotor core, so that the pole core portion has a stepped zigzag skew structure, and both end sides in axial direction of the zigzag skew structure are formed in the same shape.

3. The permanent magnet type electric rotary machine according to claim 2, wherein the outer surface of the rotor core on the q-axes to be interpolars between the adjacent permanent magnet install positions are provided with v-cut grooves in axial direction of the rotor respectively.

4. The permanent magnet type electric rotary machine according to claim 2, wherein the pole slits formed in the pole core portion have a slant angle.

5. The permanent magnet type electric rotary machine according to claim 2, wherein the pole slits formed in the pole core portion have a slant angle and are arranged at irregular pitches.

6. The permanent magnet type electric rotary machine according to claim 2, wherein the pole slits formed in the pole core portion have different slant angles respectively, and extended lines of respective slant directions intersect to each other on a center line of the pole core portion.

7. The permanent magnet type electric rotary machine according to claim 2, wherein the pole slits formed in the pole core portion are arranged symmetrically with respect to a center line of the pole core portion.

8. The permanent magnet type electric rotary machine according to claim 2,
wherein a spread angle of range of the pole core portion having the gap (g1) is within range of 90 to 120° in electrical angle with respect to a center of the rotor core.

9. The permanent magnet type electric rotary machine according to claim 2, wherein a ratio between the number of poles of the rotor and the number of slots of the stator is 2:3.

10. The permanent magnet type electric rotary machine according to claim 2, wherein the permanent magnets embedded in the rotor core are positioned in a square arrangement around the shaft hole on the whole or a v-shape arrangement protruding toward the rotor shaft insertion hole per one pole.

11. The permanent magnet type electric rotary machine according to claim 2,
wherein the outer surface of the rotor core is provided with a plurality of cut portions for defining the respective pole core portions, and
wherein each of the cut portions is formed by a combination of straight-line cuts and arc-shaped cuts.

12. The permanent magnet type electric rotary machine according to claim 2,
wherein the outer surface of the rotor core is provided with a plurality of cut portions for defining the respective pole core portions, and
wherein each of the cut portions is formed by a combination of a v-shape cut groove and an arc-shape concave portion.

13. A compressor including a permanent magnet type electric rotary machine according to claim 1.

14. A compressor including a permanent magnet type electric rotary machine according to claim 2.

* * * * *